(No Model.) 2 Sheets—Sheet 2.

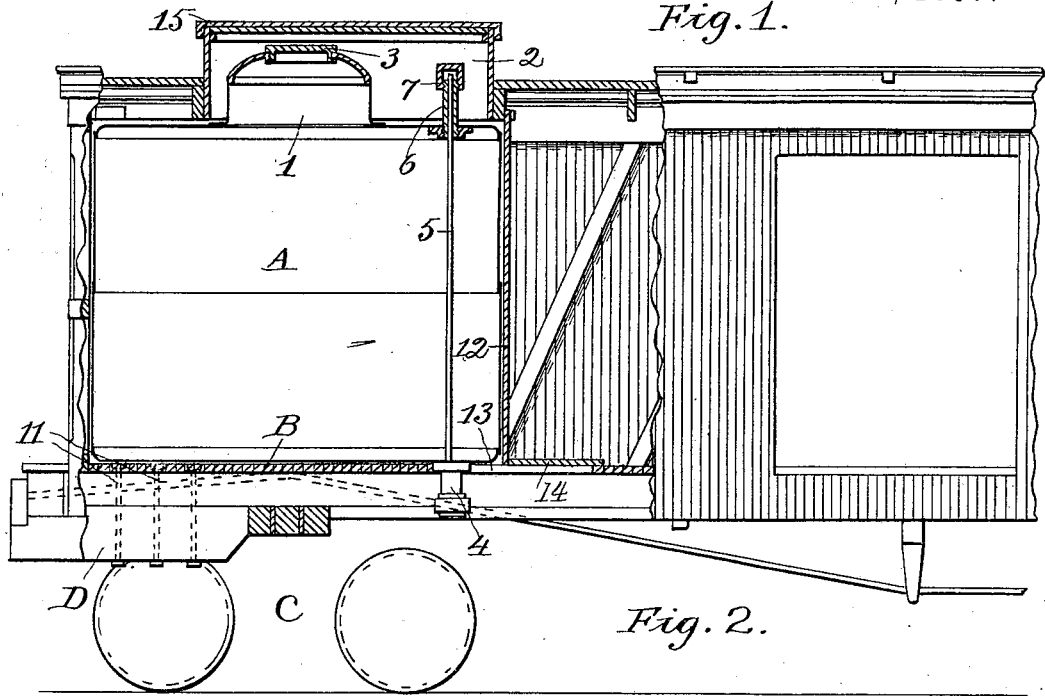
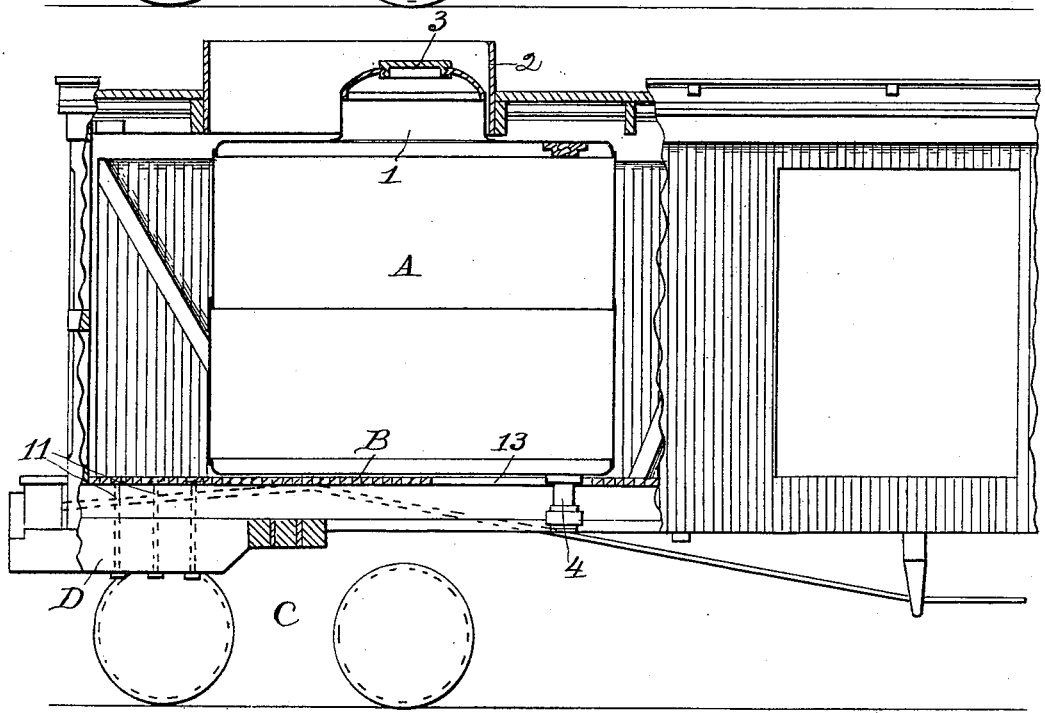

C. L. ROGERS.
COMBINED TANK AND BOX CAR.

No. 583,660. Patented June 1, 1897.

Witnesses
Albert B. Blackwood
William E. Neff

Inventor
Charles L. Rogers
By Watson & Watson Attorneys

UNITED STATES PATENT OFFICE.

CHARLES L. ROGERS, OF MILTON, PENNSYLVANIA, ASSIGNOR TO MURRAY, DOUGAL & CO., LIMITED, OF SAME PLACE.

COMBINED TANK AND BOX CAR.

SPECIFICATION forming part of Letters Patent No. 583,660, dated June 1, 1897.

Application filed February 23, 1897. Serial No. 624,685. (No model.)

*To all whom it may concern:*

Be it known that I, CHARLES L. ROGERS, a citizen of the United States, residing at Milton, in the county of Northumberland and State of Pennsylvania, have invented certain new and useful Improvements in a Combined Tank and Box Car, of which the following is a specification.

This invention relates to combined tank and box cars, or cars having tanks for the transportation of oil or other fluids and intermediate compartments which can be used to carry general merchandise when the tanks are empty or not fully loaded. In such cars as now generally constructed the tanks are inclosed in the superstructure or box of the car, and they are located in the ends thereof over the trucks. The tank therefore covers the draft-rigging, which is a part of the car which is most likely to be broken or disarranged, and it is generally necessary to remove the side, end, or top of the car in order to permit of the removal of the tank in order to get access to the upper part of the draft-rigging and the bolts which connect the same to the car-body.

According to my present invention I so construct the car that the tank may be readily moved a few feet toward the center of the car a sufficient distance to permit of any repairs which may be necessary to the draft-rigging. This is accomplished by making the partition between the merchandise-compartment and the tank-compartment removable by providing a removable section in the floor, so that the valve may be moved with the tank, and by providing an elongated raised top in which the dome of the tank can be shifted, the valve-stem and its cover being removable.

The invention will be more fully described in connection with the accompanying drawings, in which—

Figure 3:
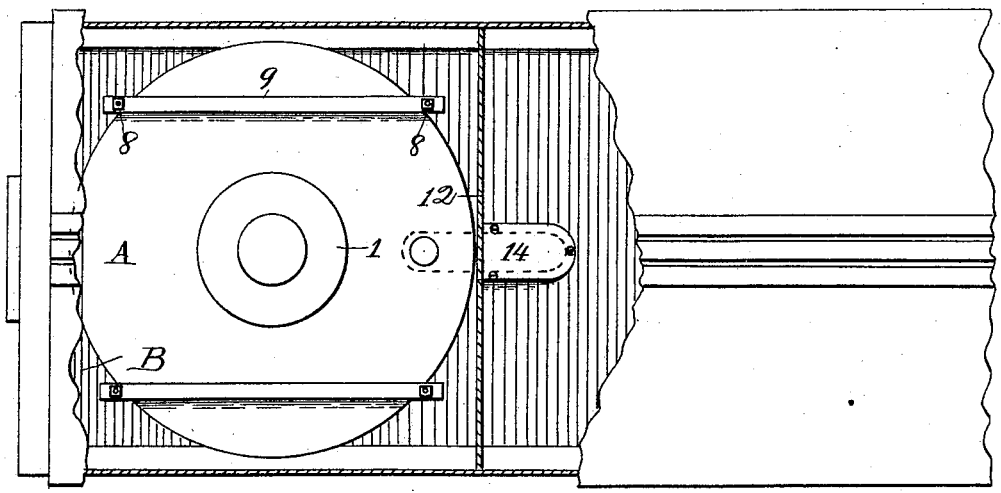
Figure 4:
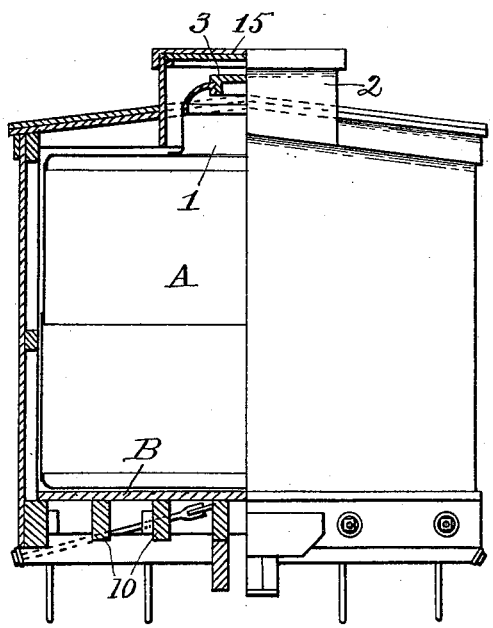

Figure 1 is a side view of one end of a car provided with my improvements, partly in section, along the center line of the car. Fig. 2 is a similar view showing the tank shifted so as to uncover the draft-rigging. Fig. 3 is a partial plan view, parts being broken away to disclose the interior. Fig. 4 is an end view, partly in cross-section.

Referring to the drawings, A indicates a cylindrical tank resting on the floor of a car B directly over the truck C. The width of the tank is equal to the inside width of the car, and it extends from the floor to the roof-timbers. On top of the tank is a dome 1, which extends above the roof of the car and is covered by a housing or raised top 2. The dome is closed by a tight cap 3, the purpose of the dome being to provide an air-cushion to absorb the shock due to the surging of the fluid in the tank. At the bottom of the tank and rigidly connected with it is a valve-casing 4, in which is located the discharge-valve. This valve is provided with a stem 5, which passes up through the top of the tank, the upper end of the stem being inclosed by a pipe 6 and cap 7. The tank is held in place in the car by clamping-bolts 8, which extend from clamp-strips 9 down through the floor-stringers 10.

It will be seen that the tank when in its normal position, as shown in Fig. 1, extends over the draft-rigging D and covers the upper ends of the draft-bolts 11. In order to get access to these draft-bolts and other parts of the draft-rigging, I so construct the car that the tank may be shifted several feet toward the center of the car, as follows: The partition 12, which separates the merchandise-compartment from the tank-compartment is so attached by screws or bolts that it can be readily removed. In the floor of the car is an elongated opening or slot 13, which is filled or covered by a piece of temporary flooring 14. The raised top or housing 2 is elongated so that the roof will not interfere with the movement of the dome, and the cover 15 of the housing 2 is removable, so that the valve-rod can be taken out, the valve-rod and its covering 6 and 7 being detachable.

The operation is as follows: When it is desirable to have access to the upper part of the draft-rigging bolts, the cover of the raised top, the inner bolts holding the tank-clamps, and the valve-rod and its covering parts 6 and 7 are removed, and also the partition 12 and the floor-piece 14. The tank can then be slid along the car-floor into the position shown in Fig. 2 and the upper part of the draft-rigging bolts thus exposed and rendered accessible.

What I claim, and desire to secure by Letters Patent, is—

1. A combined tank and box car, the tank having a dome 1 extending above the roof, in combination with the elongated housing 2 about said dome, and the removable partition 12, substantially as described.

2. In a combined tank and box car, the combination with the tank extending to the roof of the car and having a dome projecting above said roof, and a valve-casing projecting through the floor, of an elongated housing, a removable partition and an elongated opening in the car-floor, said opening having a removable cover, whereby the tank may be readily shifted off of the draft-rigging bolts, substantially as described.

3. In a combined tank and box car, the combination with the car box or body having the elongated housing, the removable partition and the elongated opening in the car-floor, of a tank extending to the roof of the car, the dome projecting into the housing above the roof, the valve-casing extending through the opening in the floor, and the valve-rod and its covering, also extending into the housing, the top of said housing and the valve-rod and its covering being removable, substantially as described.

In testimony whereóf I affix my signature in presence of two witnesses.

CHARLES L. ROGERS.

Witnesses:
W. R. KRAMER,
JOS. W. ECKMAN.